United States Patent
Miller

(10) Patent No.: US 10,547,923 B1
(45) Date of Patent: Jan. 28, 2020

(54) HANDS FREE AUDIO CAPTURE DEVICE

(71) Applicant: Donna Miller, Jonesboro, AR (US)

(72) Inventor: Donna Miller, Jonesboro, AR (US)

(*) Notice: Subject to any disclaimer, the term of this patent is extended or adjusted under 35 U.S.C. 154(b) by 257 days.

(21) Appl. No.: 15/643,468

(22) Filed: Jul. 6, 2017

Related U.S. Application Data

(63) Continuation-in-part of application No. 62/359,103, filed on Jul. 6, 2016.

(51) Int. Cl.
H04R 1/08 (2006.01)
H04M 1/19 (2006.01)
H04M 1/60 (2006.01)

(52) U.S. Cl.
CPC .............. *H04R 1/083* (2013.01); *H04M 1/19* (2013.01); *H04M 1/6058* (2013.01)

(58) Field of Classification Search
CPC ........ H04R 1/083; H04M 1/19; H04M 1/6058
USPC ......................................... 181/242
See application file for complete search history.

(56) References Cited

U.S. PATENT DOCUMENTS

| 987,563 | A | * | 3/1911 | Fields | H04R 1/083 181/20 |
| 2,408,474 | A | * | 10/1946 | Newman | H04R 1/083 181/242 |
| 2,526,177 | A | * | 10/1950 | Webb | H04R 1/083 181/21 |
| 2003/0057012 | A1 | * | 3/2003 | Owens | H04R 1/086 181/205 |
| 2016/0057618 | A1 | * | 2/2016 | Shorr | H04W 12/02 455/569.1 |
| 2016/0286019 | A1 | * | 9/2016 | Broadley | H04M 1/6058 |

* cited by examiner

Primary Examiner — Forrest M Phillips
(74) Attorney, Agent, or Firm — Schrantz Law Firm, PLLC; Stephen D. Schrantz

(57) ABSTRACT

The stenomask adapter device enables the hands-free use of an oral stenomask. In one embodiment, a stenography stenomask is inserted into the stenomask adapter device. The stenomask adapter device provides a stenomask adapter body and two arms. The arms pivotally attach to the stenomask adapter body via a fastener. A stenomask inserts into the mouth located at the front of the adapter body. A lip extending inwards secures the stenomask in the mouth. A seal is placed over an attachment head that secures the seal to the adapter body.

20 Claims, 10 Drawing Sheets

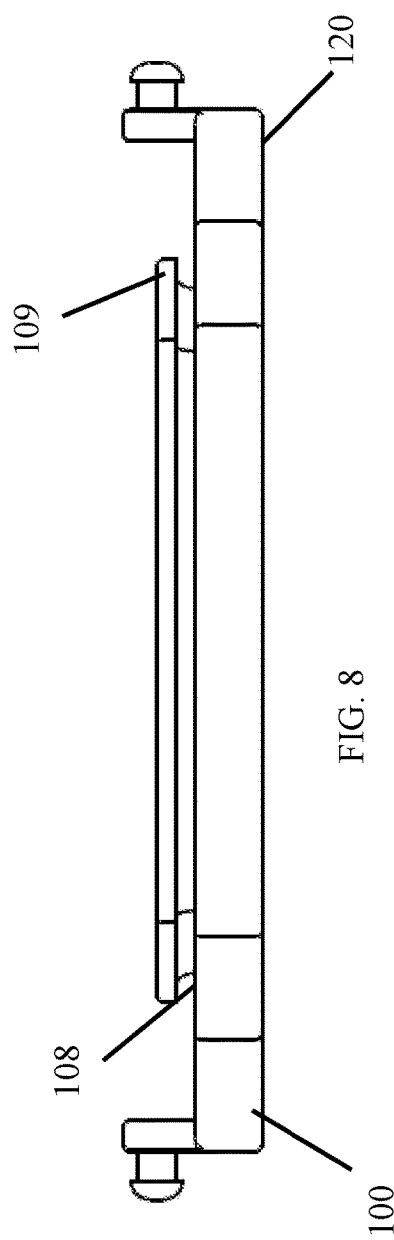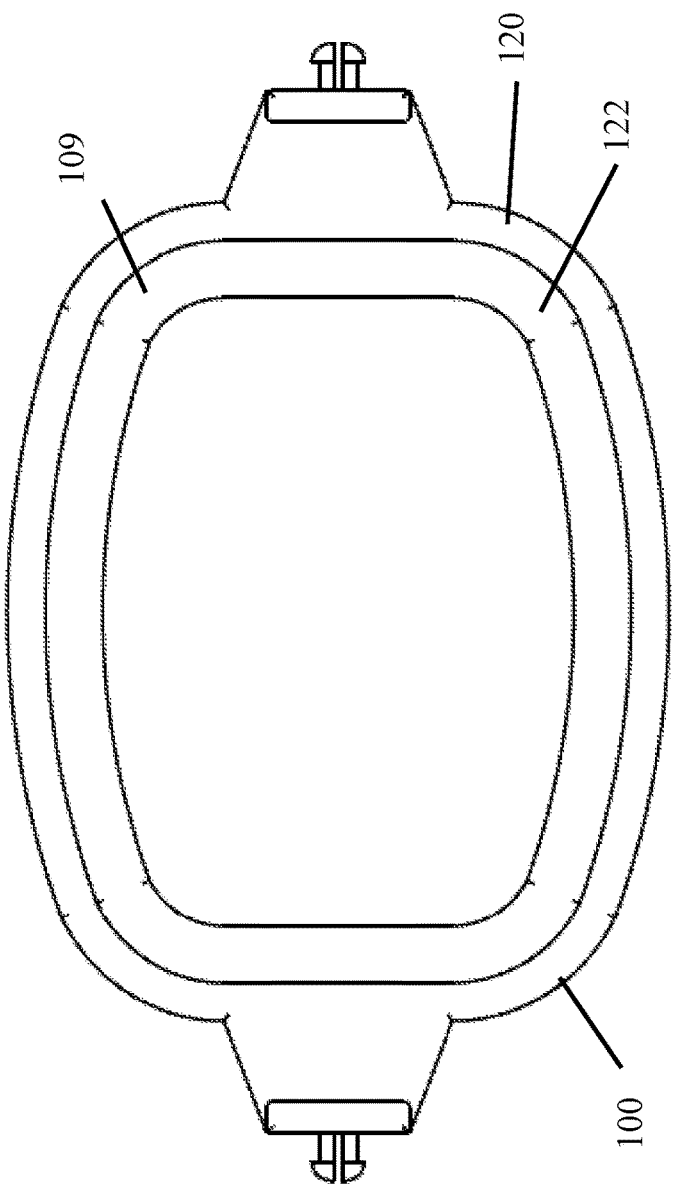

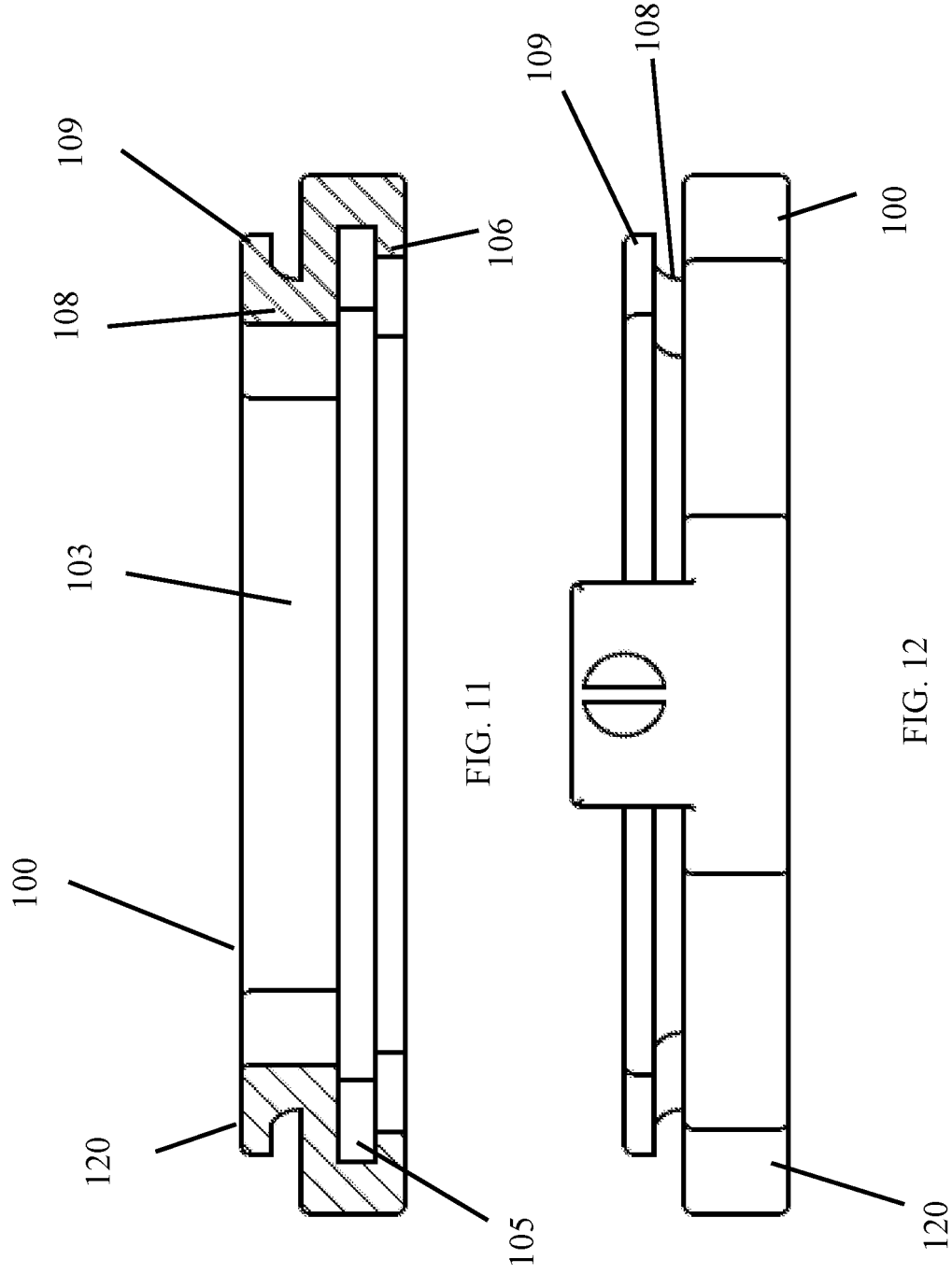

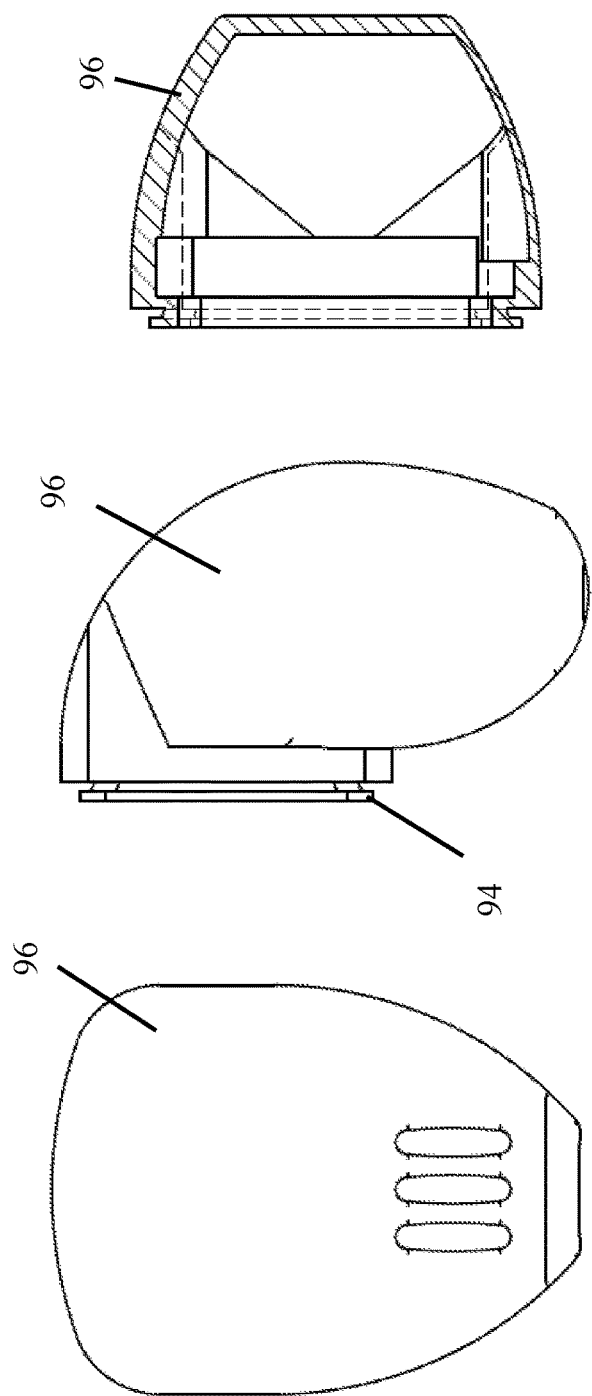
FIG. 14
FIG. 13
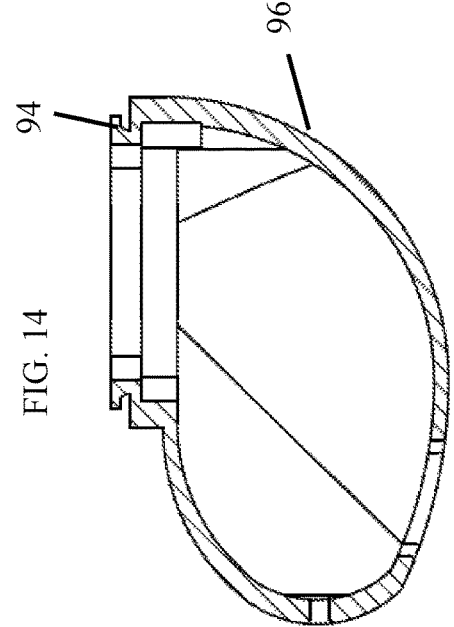
FIG. 15
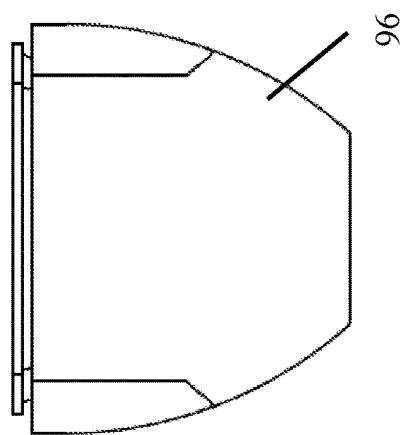
FIG. 17
FIG. 16

HANDS FREE AUDIO CAPTURE DEVICE

CROSS-REFERENCE TO RELATED APPLICATIONS

This application claims priority to and is a continuation in part of U.S. Patent Application No. 62/359,103 entitled "Stenomask Adapter Device" filed on Jul. 6, 2016.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a device that assists a user with maintaining proper placement of a stenomask during use. The stenomask provides a hand-held microphone built into a padded, sound-proof enclosure that fits over the speaker's mouth or nose and mouth. The present invention maintains the position of the stenomask by suspending the device in the proper position through the use of a mouthpiece adapter connected to two support arms. The stenomask fits into the adapter body, allowing the user to suspend the stenomask over the user's mouth for hands-free use of the stenomask.

Currently, users of a stenomask lack desirable options for holding a stenomask in place. Users may hold a stenomask to their mouth using their hand, leaving only one hand free. Users must hold the stenomask for an extended period of time which may be uncomfortable and restrictive. The user only has one hand available for other tasks when holding the stenomask. Users may also hold a stenomask in place with the use of the floor or table stand. Often, stands are not placed in an ergonomic position which may cause the user discomfort during use as well as lead to other possible medical problems.

The mouthpiece adapter device of the present invention overcomes many disadvantages of current stenomask use methods. The device provides a hands-free solution that allows comfortable, hands free use of a stenomask device. Therefore, the present invention is needed to provide a user with a functional solution for using a stenomask.

II. Description of the Known Art

Patents and patent applications disclosing relevant information are disclosed below. These patents and patent applications are hereby expressly incorporated by reference in their entirety.

U.S. Patent Publication No. 20080195390 to Almagro published on Aug. 14, 2008 (the '390 application) teaches a wireless voice muffled device for cellular or mobile phones and voice recognition. The '390 publication teaches three adaptations: handheld, handheld foldable, hands-free and palm-held.

SUMMARY OF THE INVENTION

The stenomask adapter device of the present invention enables the hands-free use of a stenomask. In one embodiment, the stenomask adapter device suspends a stenography stenomask in the proper position. The stenomask adapter device provides an adapter body secured to two over the ear hooks. The user inserts the stenomask into the adapter body over attachment lip to secure the stenomask to the adapter body. The user inserts the seal over the attachment head to attach the seal to the adapter body. The user then places the support arms over the user's ears.

The user speaks into the seal attached to the adapter body. An opening in the seal aligns with an opening in the adapter body. The seal and stenomask attach to the adapter body to align the openings of the seal and adapter body with the voice input. Such openings enable a user's voice to travel to the voice input of the stenomask.

The stenomask adapter provides an attachment head and attachment lip for securing the seal and the stenomask. The attachment head is located towards the user's face for securing the seal. The attachment lip is located away from the user's face for securing the stenomask.

The support arms attach to the stenomask adapter to form the stenomask adapter device. A fastener such as a pin or screw attaches the support arms to the stenomask adapter. The support arms extend over the ear. Curved ends form a hook for securing around the user's ears. The hooks hold the stenomask adapter device securely on the user's ears and face.

The present invention also provides for wireless communication between the stenomask and a computing device. Stenomasks are usually wired to a computing device. The present invention provides a wireless communication device that enables wireless communication with the computing device. The wireless communication device may be attached to the stems or secured within the stems. The wireless communication device may include, but is not limited to, a wireless transmitter, a wireless receiver, a wireless transceiver, and/or a wireless transmitter and receiver.

Accordingly, it is an object of the present invention to provide a device that enables hands free use of a stenomask.

It is another object of the present invention to provide a convenient method of suspending a stenomask by a user's face.

It is another object of the present invention to provide a comfortable method of using a stenomask.

It is another object of the present invention to provide a compact device that may easily travel.

It is another object of the present invention to provide a device that can be easily fitted to a user's head.

It is another object of the present invention to provide a device that limits contact with the user's head and hair when placing the stenomask near the user's mouth.

It is another object of the present invention to provide a device that reduces the disheveling of the user's hair when using the device.

It is another object of the present invention to provide a wireless device that wirelessly communicates.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 8 is a bottom view thereof;

FIG. 9 is a front view thereof;

FIG. 11 is a sectional view thereof;

FIG. 12 is a left side view thereof, the right side view being a mirror image of the left side view;

FIG. 13 is a rear view of the stenomask of one embodiment of the present invention;

FIG. 14 is a right side view thereof, the left side view being a mirror image of the right side view;

FIG. 15 is a sectional view thereof;

FIG. 16 is a top view thereof and

FIG. 17 is a sectional view thereof.

DETAILED DESCRIPTION

Figure 1:
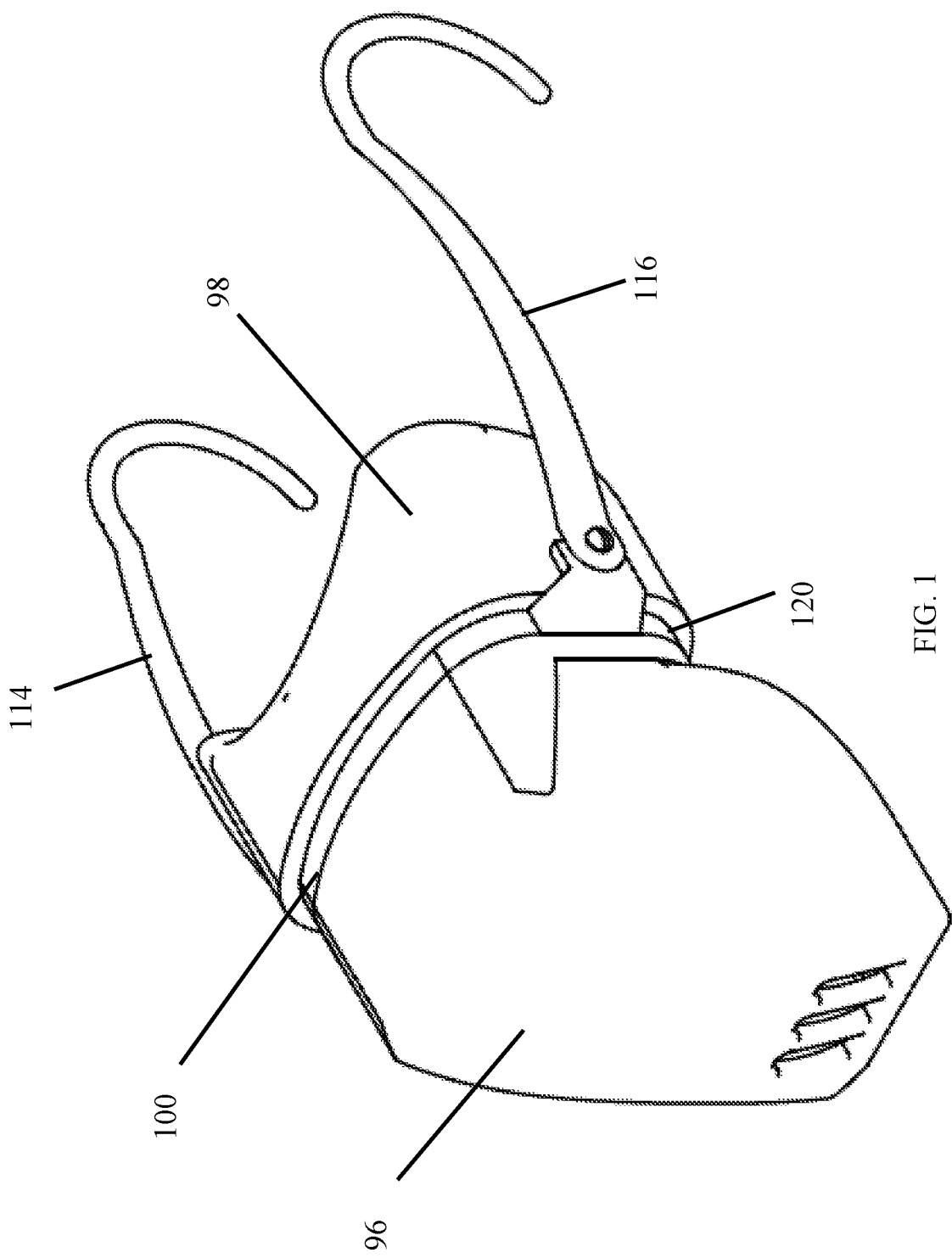
FIG. 1 is an environmental view of the stenomask adapter device of one embodiment of the present invention.
Figure 2:
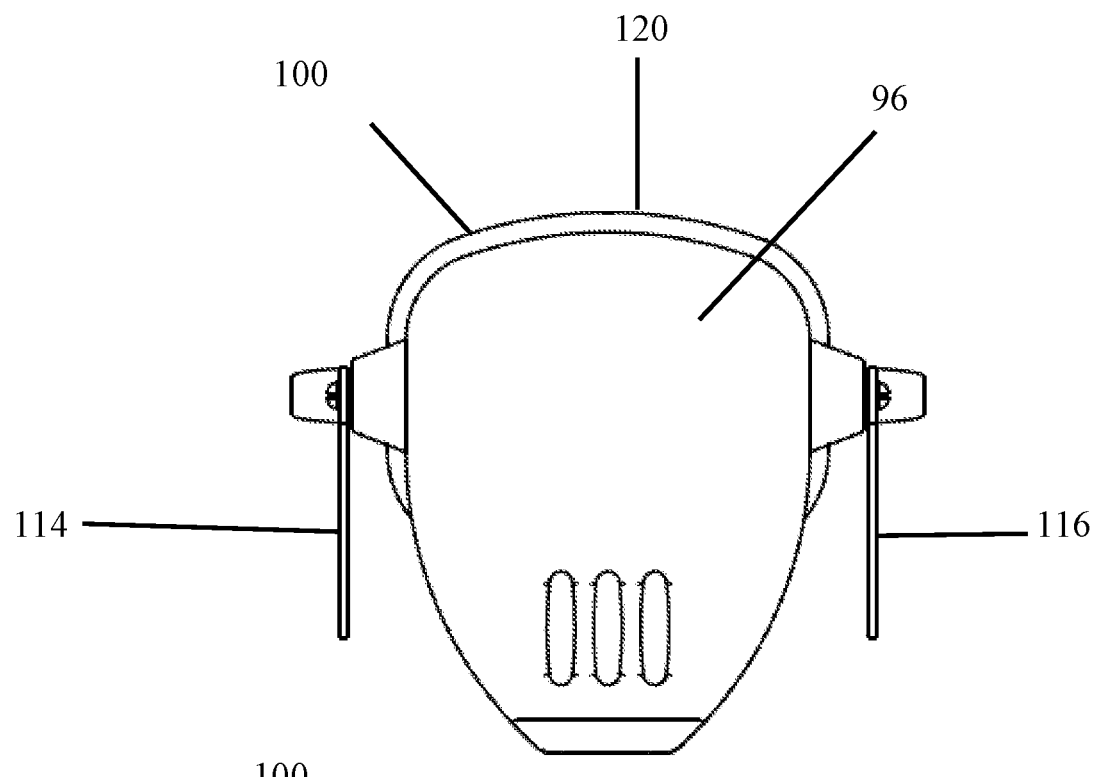
FIG. 2 is a rear view thereof.
Figure 3:
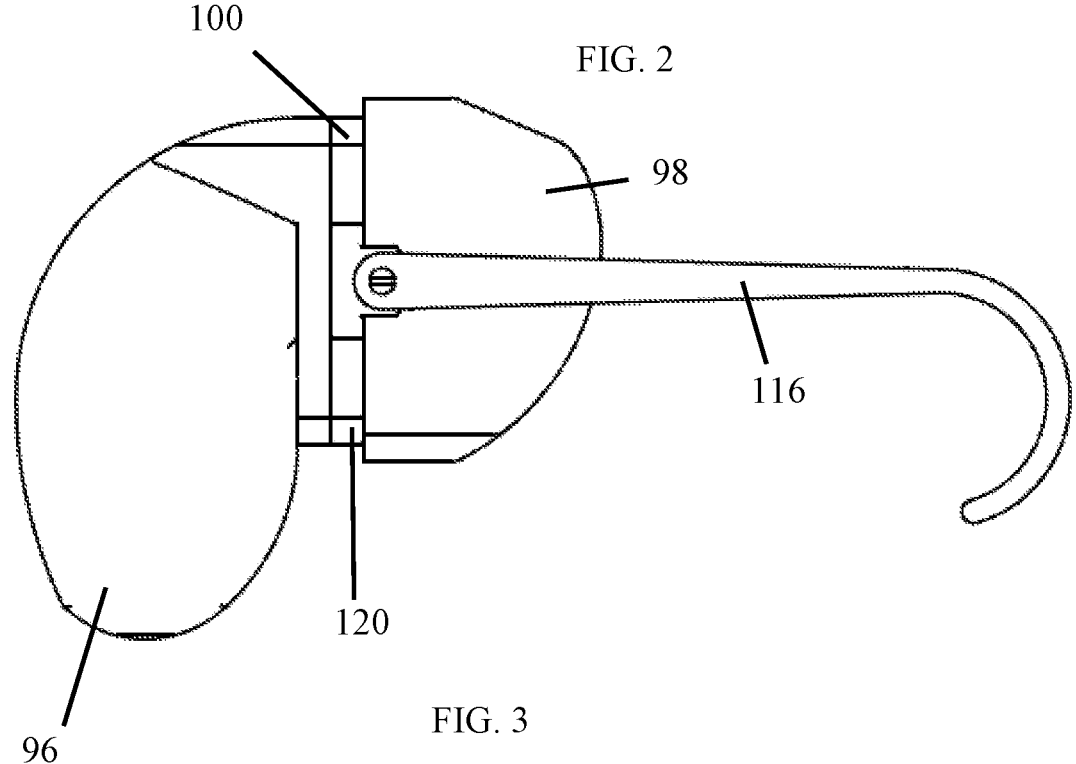
FIG. 3 is a left side view thereof.

FIGS. 1-3 show the adapter device 100 of the present invention. The adapter device attaches to the stenomask 96 and seal 98. The stenomask 96 provides an audio capturing device, such as a microphone, audio input, or other audio recorder, that captures audio. The user speaks into the seal 98 and stenomask 96 to reduce the audio transmitted to the environment and increase the audio transmitted to the audio capturing device. Such a seal 98 enables the audio input to capture the words spoken by the user without requiring the user to speak significantly louder. The seal 98 and stenomask 96 are advantageous in that the user can speak into the seal while limiting any interruptions to the user's surrounding environment.

The adapter device 100 enables the hands-free use of a stenomask 96 and seal 98. In one embodiment, a stenography stenomask 96 inserts into the stenomask adapter 120. The stenomask adapter body 120 provides support arms 114, 116 that are placed around the user's ears. The support arms 114, 116 position the seal 98 over the user's mouth. The user may then speak into the seal 98 for the user's voice to travel through the seal 98 through the opening into the stenomask 96 to the audio capturing device.

Figure 4:
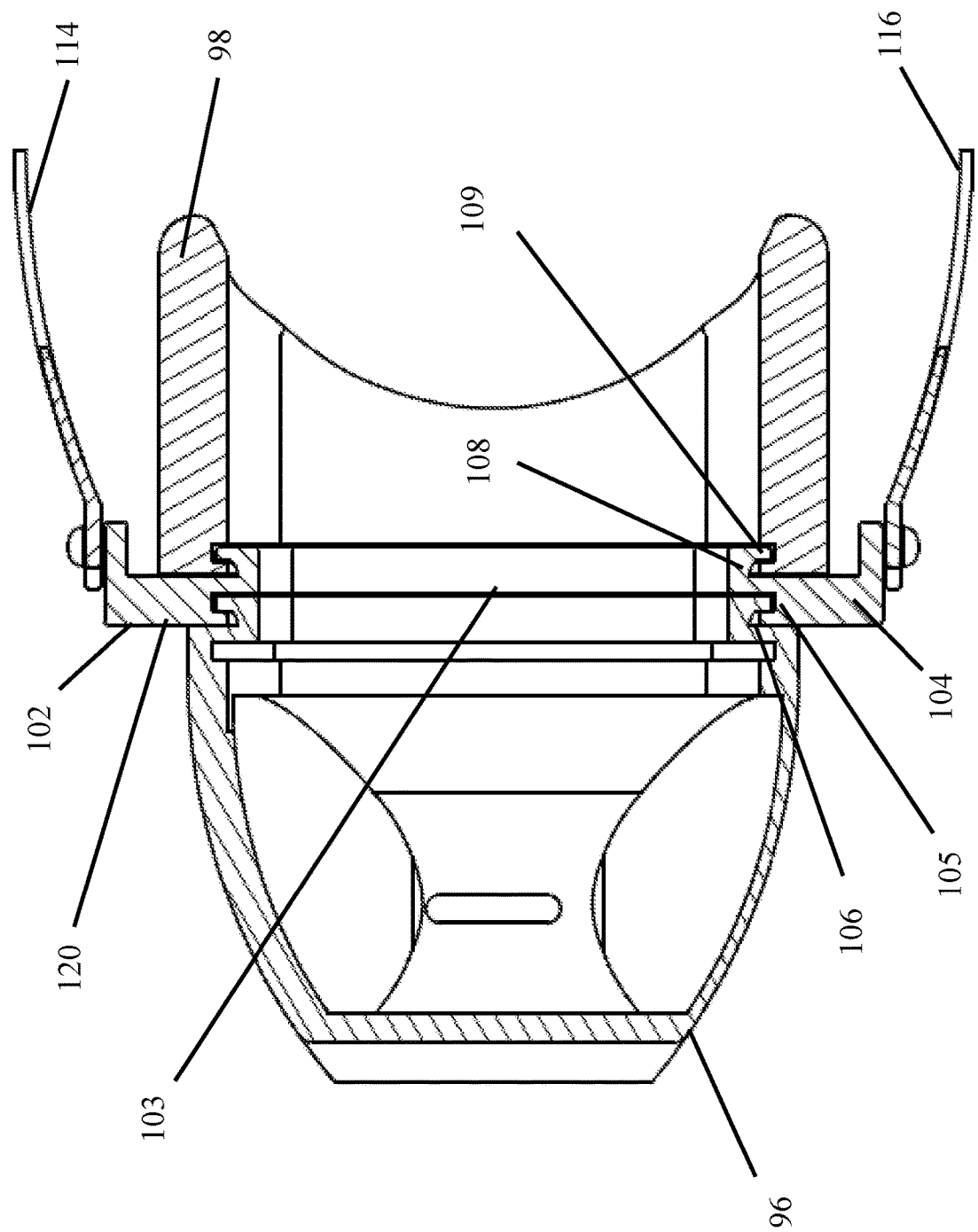
FIG. 4 is a sectional view thereof.

FIG. 4 shows a sectional view of the seal 98 secured to the adapter body 120. Attachment head 109 secures the seal 98 onto the adapter body 120. The seal 98 is placed over the attachment head 109 onto neck 108. Attachment head 109 secures the seal 98 onto the adapter body 120. The attachment head inserts 109 into a corresponding groove of seal 98 to mate the seal 98 with the adapter body 120.

FIG. 4 also shows the mouth 105 of the adapter body 120. Stenomask 96 inserts into mouth 105. Lip 106 inserts into a corresponding groove of the stenomask 96 to secure the stenomask onto the adapter body 120. The attachment neck 108 limits further insertion of the stenomask 96 into mouth 105.

Continuing to refer to FIG. 4, opening 103 allows the user's voice to travel through adapter body 120. Opening 103 aligns with an opening in the seal 98 and the stenomask 96. The opening 103 allows for insertion of the stenomask 96 into the mouth 105. Lip 106 protrudes laterally inwards from the mouth 105 to narrow the opening 103 at lip 106. The lip 106 is located at the rear of the adapter body 120 on an outer side away from the user. The opening 103 widens at mouth 105 as the opening 103 progresses to the front from lip 106.

The opening 103 then narrows again at neck 108 as the opening 103 progresses forward from the mouth 105 to neck 108. The widening of opening 103 at mouth 105 mates the stenomask with the adapter body 120. Neck 108 limits the forward movement of the stenomask within the opening 103.

Opening 103 narrows at neck 108 to limit rearward movement of the seal through the opening 103. Opening 103 also narrows at neck 108 to limit forward movement of the stenomask through the opening 103.

Figure 5:
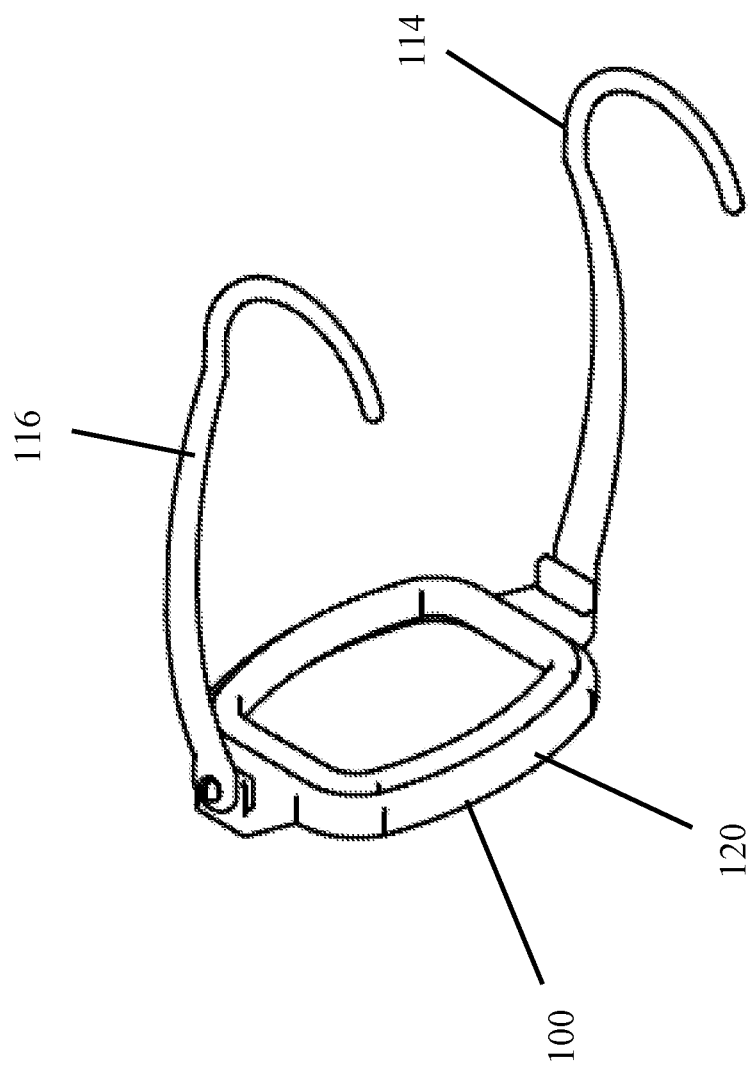
FIG. 5 is a perspective view of an adapter body and support arms of one embodiment of the present invention.

FIG. 5 shows the adapter device 100 with the seal and stenomask removed. Support arms 114, 116 attach to the adapter body 120. The support arms 114, 116 may be stems similar to glasses. The support arms 114, 116 provide hooks that are placed onto the user's ears. The support arms 114, 116 pivotally attach to the adapter body 120 to raise or lower the adapter body in relation to the hooks of the support arms.

Figure 6:
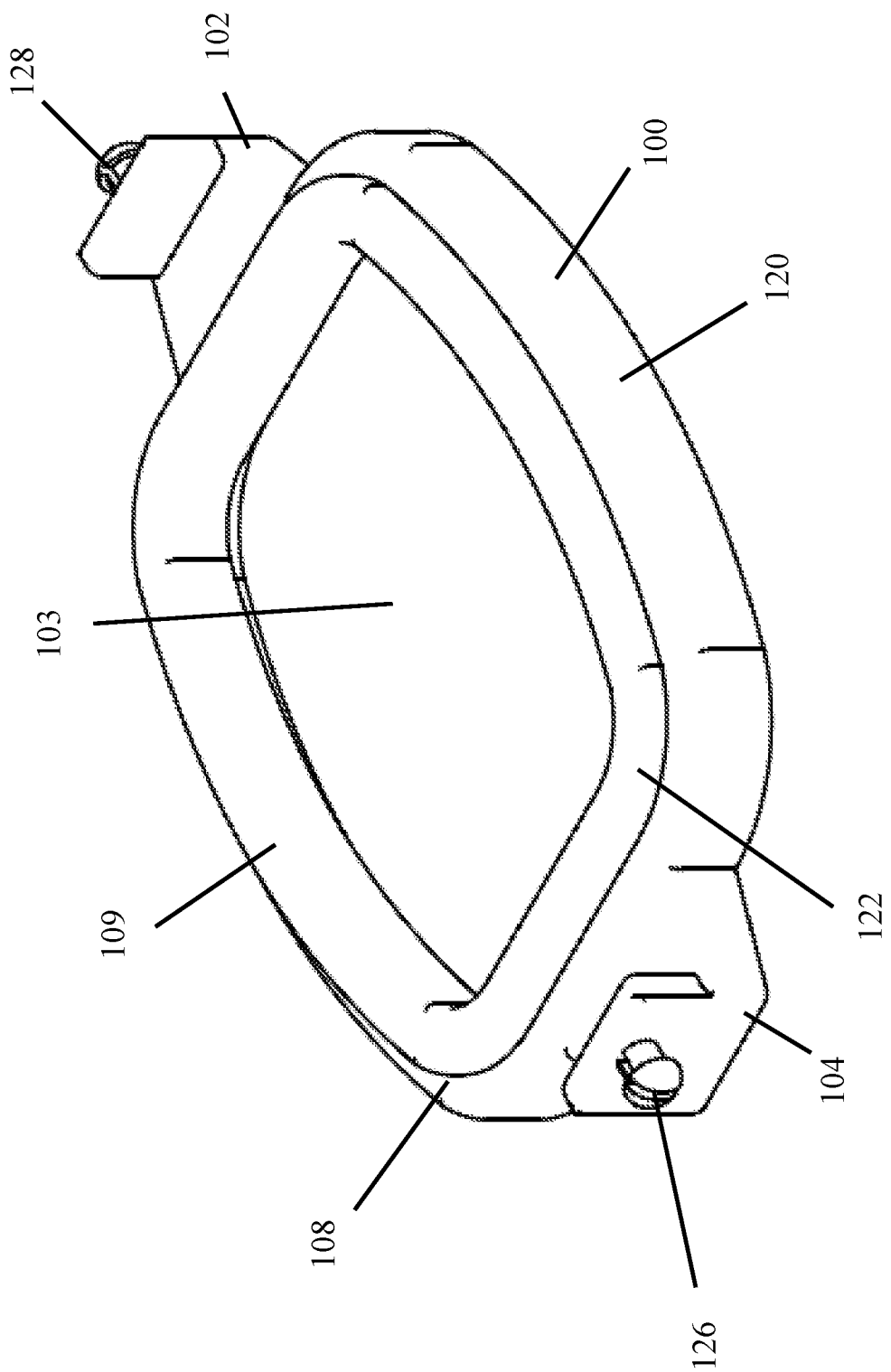
FIG. 6 is a front perspective view of an adapter body of one embodiment of the present invention.

FIG. 6 shows a perspective view of the adapter body 120. The opening 103 extends along a longitudinal axis through the adapter body 120. The attachment head 109 extends laterally outward from the neck 108. The attachment head 109 is located on an inner side 122 of the adapter body 120 and adapter device 100 towards the user.

Figure 7:
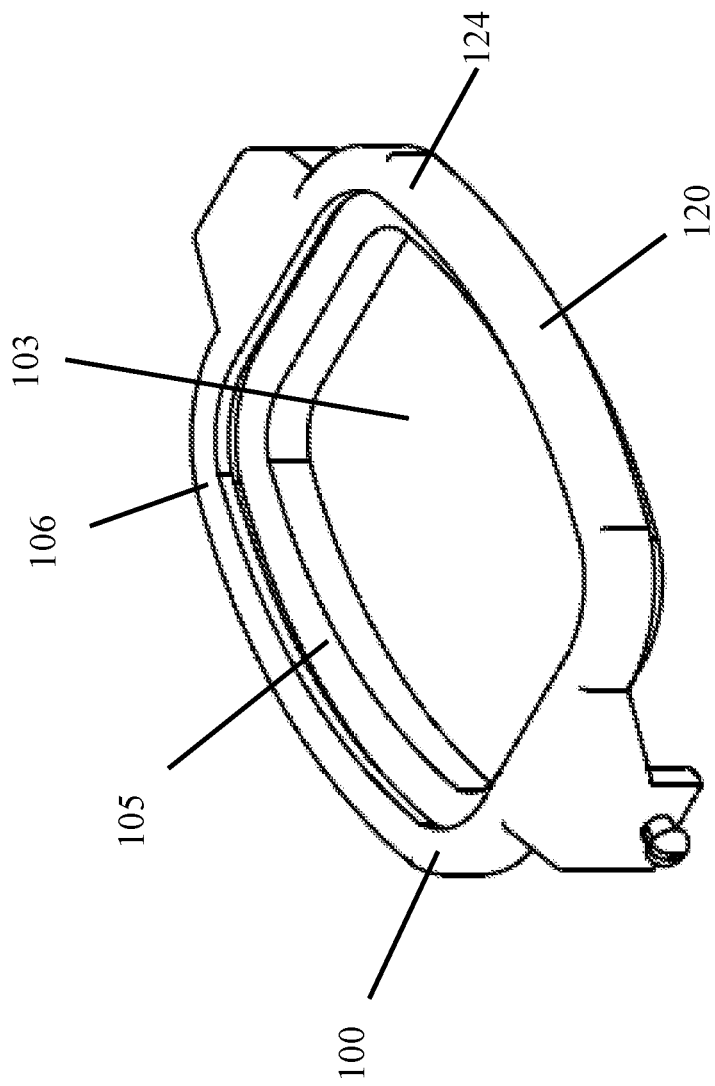
FIG. 7 is a rear perspective view thereof.

FIG. 7 shows a perspective view of the adapter body 120. The opening 103 extends along a longitudinal axis through the adapter body 120. The lip 106 extends laterally inward from the mouth 105. The lip 106 is located on an outer side 124 of the adapter body 120 away from the user.

FIGS. 8 and 9 show the attachment head 109 and the attachment neck 108. The attachment head 109 extends laterally outward from the neck 108. The inner side 122 is placed nearest the user. The seal attaches on the inner side 122 near the user.

Figure 10:
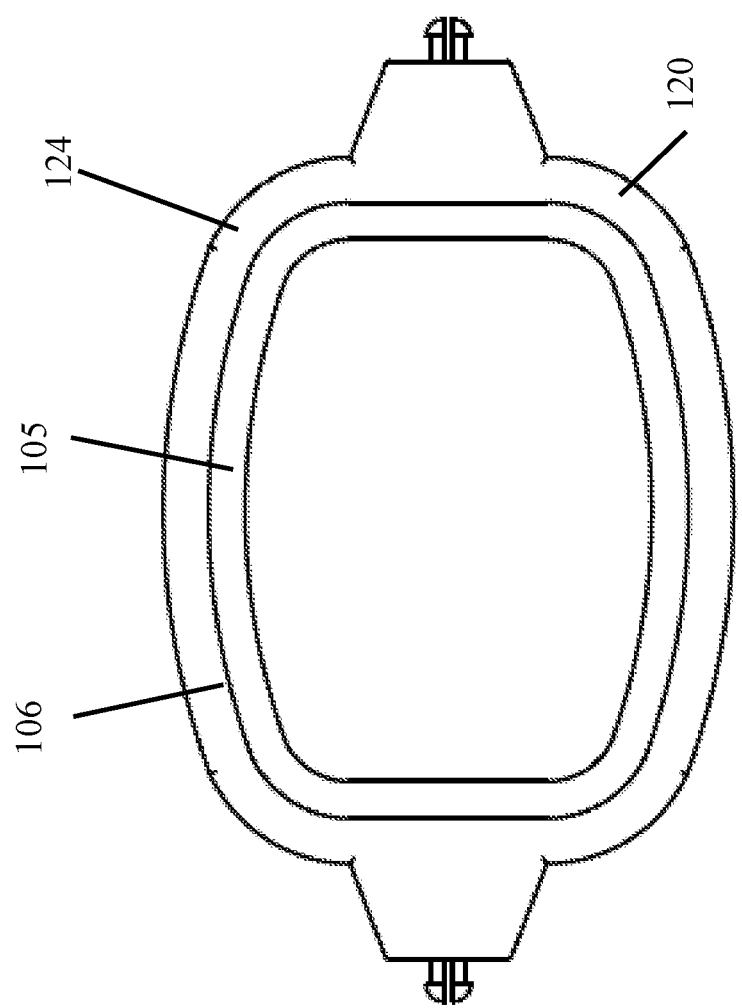
FIG. 10 is a rear view thereof.

FIG. 10 shows the mouth 105 and the lip 106 on the outer side 124 of the adapter body 120. The outer side 124 is placed away from the user. The stenomask attaches to the outer side 124 of the adapter body 120. The user's voice travels through the seal placed near the user towards the rear to the stenomask.

FIGS. 11 and 12 show the attachment head 109 and neck 108. The seal is placed over attachment head 109 onto neck 108. The attachment head 109 inserts into a groove on the seal to mate the attachment body 120 with the seal. The attachment head 109 extends laterally outward from the attachment neck 108. The protrusion of attachment head 109 allows the mating of the attachment head 109 with a groove in the seal.

FIG. 11 also shows a sectional view showing the lip 106 and mouth 105. The lip 106 extends laterally inward from the mouth 105. Opening 103 widens at mouth 105 beyond the lip 106. The opening then narrows at neck 108. The narrowing at neck 108 limits movement of the stenomask through the adapter body 120.

Opening 103 extends through attachment body 120. The opening widens and narrows from the front of the adapter body 120 to the rear of the adapter body 120. The user inserts a stenomask into the rear of the opening 103 for attachment of the stenomask at mouth 105. Lip 106 secures the stenomask within opening 103 at mouth 105. The user places the seal over opening 103 and attachment head 109 to secure the seal to the adapter body at the front of the adapter body. The seal is placed on an inner side near the user. The stenomask is placed on an outer side away from the user.

Referring to FIGS. 1-6, the attachment shoulders 102, 104 provide fasteners 126, 128 for securing the support arms 114, 116. The support arms 114, 116 attach to the attachment body 120 at attachment shoulders 102, 104. The support arms 114, 116 provide attachment apertures for accepting fasteners 126, 128. Support arms 114, 116 connect to adapter body 120 by inserting fasteners 126, 128 into attachment apertures of support arms 114, 116.

After the stenomask and seal are secured to the attachment body 120, the user places support arms 114, 116 over the user's ears to secure the device in place. Support arms 114, 116 hold the stenomask in the proper position over the user's mouth. One end of the supports arms 114, 116 is curved to ensure that the stenomask adapter device is securely held on the user's ears.

The adapter device 100 may be constructed from plastic, metal, wood, carbon fiber, or other rigid material. The shoulders 102 and 104 extend outward from the adapter body 120. The attachment shoulders 102, 104 extend to the front of the adapter body 120 to direct the support arms towards the user.

FIGS. 13-17 show the stenomask 96. The stenomask 96 provides an audio capture device such as a microphone. The stenomask 96 provides a finger that inserts into the mouth of the adapter body to secure the stenomask to the adapter body.

The stenomask 96 provides a wireless communication device that connects the audio capture device to a computing device. The wireless communication device eliminates the need to connect the stenomask to a computing device with a wire. The wireless communication device provides a wireless transmitter, a wireless receiver, a wireless transceiver, and/or a wireless transmitter and receiver. A Bluetooth device may serve as the wireless communication device. Other wireless communication devices may be used.

The stenomask also provides a power source, such as a battery or rechargeable battery. The power source powers the audio capture device and the wireless communication device. A charging port within the stenomask allows for charging the power source. In one embodiment, the charging port is a USB port, a micro-USB port, or other port that will also allow for wired communication with a computing device.

The stenomask also provide a power indicator to indicate that the stenomask is on or off. The power indicator may be a light that uses colors to indicate whether the power is on or off. The power indicator may also provide a light to indicate the amount of charge remaining in the power source. The power indicator can warn the user that the stenomask needs charging.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A device for positioning a stenomask and a seal in front of a user's mouth to provide for hands free operation of the stenomask, the device comprising:

an adapter body having a front side and a rear side, the adapter body securing the stenomask to the rear side of the adapter body, the adapter body securing the seal to the front side of the adapter body;

an opening extending through the adapter body wherein the adapter body defines the opening, the opening extending from the front side to the rear side of the adapter body;

a first stem and a second stem secured to the adapter body wherein the first stem and second stem are configured to be placed on the user's ears;

an earpiece of the first stem wherein the earpiece extends downward, the earpiece configured to be placed around the user's ear, wherein the earpiece remains fixed in relation to the first stem.

2. The device of claim 1 wherein the opening extends along a longitudinal axis through the adapter body.

3. The device of claim 2 wherein the opening widens towards the rear of the adapter body.

4. The device of claim 2 further comprising:

an attachment head upon which the seal attaches wherein the seal attaches laterally outward of the attachment head.

5. The device of claim 4 further comprising:

an attachment neck located rearward of the attachment head wherein the attachment neck is located laterally inward from the outer surface of the attachment head.

6. The device of claim 5 further comprising:

a mouth located rearward of the attachment neck wherein the opening widens at the mouth.

7. The device of claim 6 further comprising:

a lip located rearward of the mouth wherein the opening narrows at the lip.

8. The device of claim 1 further comprising:

an audio capture device located at the stenomask.

9. The device of claim 8 further comprising:

a wireless communication device that communicates with the audio capture device wherein the wireless communication device communicates with a computing device to transmit the audio captured by the audio capture device to the computing device.

10. A device for positioning a stenomask and a seal in front of a user's mouth to provide for hands free operation of the stenomask, the device comprising:

an adapter body having a front side and a rear side, the adapter body securing the stenomask to the rear side of the adapter body, the adapter body securing the seal to the front side of the adapter body;

an opening extending through the adapter body wherein the adapter body defines the opening, the aperture extending from the front side to the rear side of the adapter body;

a first stem and a second stem pivotally secured to the adapter body wherein the first stem and second stem are configured to be placed on the user's ears;

a right pivotal attachment securing the first stem to the attachment body, wherein the first stem pivots around the right pivotal attachment; and a left pivotal attachment securing the second stem to the attachment body, wherein the second stem pivots around the left pivotal attachment.

11. The device of claim 10 further comprising:

an audio capture device located rearward of the adapter body;

a wireless communication device that communicates with the audio capture device wherein the wireless communication device communicates with a computing device to transmit the audio captured by the audio capture device to the computing device.

12. The device of claim 10 wherein the opening extends along a longitudinal axis through the adapter body, wherein the opening widens towards the rear of the adapter body.

13. The device of claim 12 further comprising:

an attachment head upon which the seal attaches wherein the seal attaches laterally outward of the attachment head.

14. The device of claim 13 further comprising:

an attachment neck located rearward of the attachment head wherein the outer surface of the attachment neck is located laterally inward from the outer surface of the attachment head.

15. The device of claim 14 further comprising:

a mouth located rearward of the attachment neck wherein the opening widens at the mouth.

16. The device of claim 15 further comprising:

a lip located rearward of the mouth wherein the opening narrows at the lip.

17. A device for positioning a stenomask and a seal in front of a user's mouth to provide for hands free operation of the stenomask, the stenomask transmitting captured audio to a computing device, the device comprising:

an adapter body having a front side and a rear side, the adapter body securing the stenomask to the rear side of the adapter body, the adapter body securing the seal to the front side of the adapter body;

an opening extending through the adapter body wherein the opening extends along a longitudinal axis through the adapter body, the opening widening towards the rear of the adapter body;

wherein the adapter body defines the opening, the opening extending from the front side to the rear side of the adapter body;

a first stem and a second stem secured to the adapter body wherein the first stem and second stem are configured to be placed on the user's ears;

a hook of the first stem wherein the hook extends downward, the hook configured to be placed around the user's ear, the hook fixed in relation to the stem, the hook and stem providing an opening for exposing the user's ear; and a hook of the second stem wherein the hook extends downward, the hook configured to be placed around the user's ear, the hook fixed in relation to the stem, the hook and stem providing an opening for exposing the user's ear without covering the user's ear.

18. The device of claim 17 further comprising:

an audio capture device located rearward of the adapter body;

a wireless communication device that communicates with the audio capture device wherein the wireless communication device communicates with the computing device to transmit the audio captured by the audio capture device to the computing device.

19. The device of claim 17 further comprising:

a right pivotal attachment securing the first stem to the attachment body, wherein the first stem pivots around the right pivotal attachment, wherein the hook of the first stem at least partially revolves around the right pivotal attachment;

a left pivotal attachment securing the second stem to the attachment body, wherein the second stem pivots around the left pivotal attachment, wherein the hook of the second stem at least partially revolves around the left pivotal attachment;

wherein the first support arm and second support arm pivotally attach to the adapter device.

20. The device of claim 19 wherein the first support arm and second support arm enable the adapter body to move vertically in relation to the free end of the first support arm and the second support arm.

* * * * *